May 5, 1936.  G. PIELSTICK  2,039,342

SPRING ELEMENT

Filed Feb. 21, 1934

Inventor
Gustav Pielstick
by Maréchal & Noe
attys.

Patented May 5, 1936

2,039,342

UNITED STATES PATENT OFFICE 2,039,342

SPRING ELEMENT

Gustav Pielstick, Augsburg, Germany, assignor to Maschinenfabrik Augsburg-Nurnberg A. G., Augsburg, Germany, a corporation of Germany Application February 21, 1934, Serial No. 712,334
In Germany February 27, 1933

6 Claims. (Cl. 267—1)

This invention relates to spring elements.

One object of the invention is the provision of a spring element adapted for use in shock absorbers, flexible couplings and in many other places, and embodying a series of nested spring shells of simple construction and cooperatively arranged to yieldingly transmit a force from one point to another.

Another object of the invention is the provision of a spring element embodying a series of nested spring shells substantially C-shaped in cross-section and cooperating with an inner core the curved surface of which has a smaller radius than the normal inside radius of curvature of the inner shell.

Other objects and advantages of the invention will be apparent from the following description, the appended claims and the accompanying drawing, in which,—

Figure 1:
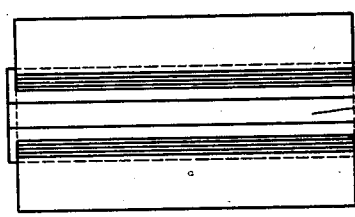
Fig. 1 is a side elevation of a spring element embodying the present invention.
Figure 2:
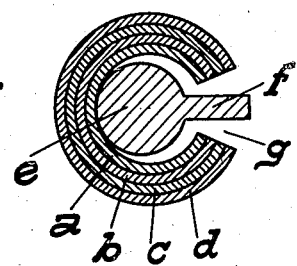
Fig. 2 is a central transverse section through the spring element.

Referring more particularly to the drawing by reference letters, Figs. 1 and 2 show a spring element comprising a series of concentrically telescoped, or nested, metal spring shells each being longitudinally slotted along one complete side and thus substantially C-shaped in cross-section. The several spring shells $a$, $b$, $c$, and $d$ are arranged or curved around a core member $e$ which has a projecting rib $f$ extending into the space $g$ between the opposed side edges of the several spring shells. The radius of curvature of the curved surface of the core $e$ is considerably less than the normal radius of curvature of the inner surface of shell $a$ so that the shell $a$ departs gradually away from the outer surface of the core from a line of contact. When a force is exerted tending to compress the spring shells and bring their adjacent edges closer together the inner spring shell $a$ is wrapped to a substantial extent around the core so that the resistance to spring flexure is gradually increased as the load is increased, and the flexibility of the spring is maintained within its elastic limit. The elasticity of the spring element can be made any desired value, depending upon the number of spring shells employed.

Inasmuch as the rib $f$ projects through the longitudinal slot or open side of the several shells, the latter are prevented from excessive relative rotational movement one on the other. The core and its rib extend the full length of the spring shells, and permit the use of the several spring shells without any permanent fastening means for securing one shell to another. The several shells can thus be uniformly stressed and an applied force divided among the several shells in accordance with their respective capacities.

Figure 3:
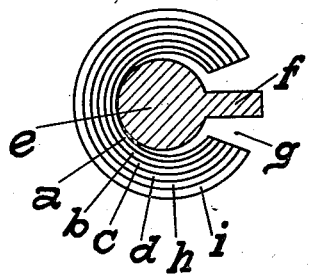
Fig. 3 is an end view of a spring element having spring shells of graduated thickness, the core being shown in section.

The several spring shells $a$, $b$, $c$, and $d$ are preferably made from bent and hardened metal blanks, and may be of varying strength or flexibility. The thickness of the material of the successive shells may decrease toward the center of the spring element in accordance with the distance of the spring shell from the central axis of the element. Thus the innermost shell may be of considerably smaller thickness because it has the shortest leverage for the transmission of forces,—that is during compression the innermost shell is required to bend around a smaller radius than an outer shell. The thicknesses of the outer shells are increased in proportion to their radius of curvature so that all shells may be uniformly stressed. Thus as shown in Fig. 3 the thickness of the several shells $a$, $b$, $c$, $d$, $h$, and $i$ gradually varies so as to increase by successive steps from the innermost shell to the outermost shell in proportion to the radius of the shells.

Figure 4:
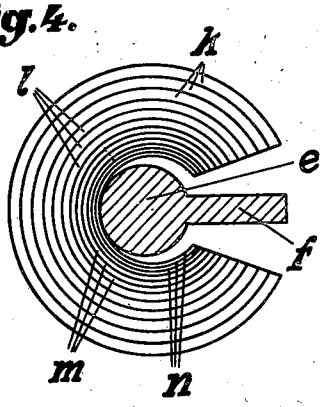
Fig. 4 is an end view corresponding to Fig. 3 but showing a modified form of construction in which groups of spring shells are of graduated strength.

In Fig. 4 a construction is known in which the thickness of the group of spring shells $k$ is the same, but the thickness of the shells $k$ is greater than the thickness of the several shells $l$ of an intermediate group. A second intermediate group of shells $m$ is provided, all of the same thickness but of less thickness than the shells $l$, the innermost group of shells $n$ having still smaller thickness in proportion to the radius of curvature. Such a construction is particularly desirable where a large number of spring shells must be employed, as a comparatively few different thicknesses of material may be utilized instead of slowly graduating the thickness from one individual shell to the next.

Spring elements of the character herein set forth may be used in a great many places which formerly employed coil, spiral or leaf springs. A spring element for example may be inserted in a longitudinal bore somewhat smaller in diameter than the normal outside expanded diameter of the unstressed spring and provided in a plurality of relatively rotatable elements of a coupling so as to yieldingly interconnect the two elements for the transmission of power, as disclosed in the copending application entitled "Coupling", Serial No. 712,335, filed on even date herewith.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A spring element of the character described comprising a plurality of nested spring shells of substantially cylindrical curvature each having an open side and each substantially C-shaped in cross-section, each shell being free to turn with respect to an adjacent shell and free to rub on an adjacent shell throughout substantially its entire extent when the spring element is expanding and contracting.

2. A spring element of the character described comprising a plurality of nested spring shells of substantially cylindrical curvature and of different thicknesses each having an open side and of substantial C-shape in cross-section, each shell having only frictional engagement with an adjacent shell, the thickness of the shells increasing in accordance with the distance of a shell from the central axis.

3. A spring element of the character described adapted for insertion in a cylindrical passage comprising a plurality of nested spring shells each having an open side and each substantially C-shaped in cross-section, the ends of each shell being free to rub on an adjacent shell when the spring element is expanding and contracting, and a rigid core around which the bight portion of the inner shell is curved, said core having a curved surface with a radius of curvature less than the normal inside radis of curvature of the inner shell.

4. A spring element of the character described comprising a plurality of nested spring shells each having an open side and each substantially C-shaped in cross-section, a rigid core around which the inner shell is curved, and a rib on said core projecting through the openings in the sides of said shells.

5. A spring element of the character described comprising a plurality of nested spring shells each having an open side and each substantially C-shaped in cross-section, and a rigid core around which the inner shell is curved, said core having a curved surface which departs gradually from a point of contact with the inner shell, and a rib on said core projecting through the openings in the sides of said shells.

6. A spring element of the character described comprising a plurality of nested spring shells each having an open side and each curved substantially cylindrically in cross-section, both ends of each shell being free to rub on an adjacent shell when the spring element is expanding and contracting, and a rigid core around which the bight portion of the inner shell is curved, said core having a curved surface with a radius of curvature less than the normal inside radius of curvature of the inner shell.

GUSTAV PIELSTICK.

CERTIFICATE OF CORRECTION.

Patent No. 2,039,342. May 5, 1936.

GUSTAV PIELSTICK.

It is hereby certified that error appears in the printed specification of the above numbered patent requiring correction as follows: Page 1, second column, line 35, for the word "known" read shown; and that the said Letters Patent should be read with this correction therein that the same may conform to the record of the case in the Patent Office.

Signed and sealed this 4th of August, A. D. 1936.

Henry Van Arsdale

Seal) Acting Commissioner of Patents.